United States Patent [19]
Blitz

[11] 3,713,143
[45] Jan. 23, 1973

[54] LOW DATA RATE DISPLAYS
[75] Inventor: Daniel Blitz, Boston, Mass.
[73] Assignee: Sanders Associates, Inc., Nashua, N.H.
[22] Filed: July 6, 1970
[21] Appl. No.: 52,238

[52] U.S. Cl. ................................................343/5 R
[51] Int. Cl. ..............................................G01s 7/26
[58] Field of Search ..................343/5 R, 6 R, 7, 3, 11

[56] References Cited

UNITED STATES PATENTS

| 3,323,126 | 5/1967 | Malone et al | 343/7.9 |
| 2,586,391 | 2/1952 | Sheldon | 343/5 R |
| 2,540,110 | 2/1951 | Gall | 343/5 R |
| 2,715,726 | 8/1955 | Rychlik | 343/5 R |

FOREIGN PATENTS OR APPLICATIONS

| 1,098,723 | 2/1961 | Germany | 343/5 R |
| 956,813 | 4/1964 | Great Britain | 343/5 R |

Primary Examiner—Stephen C. Bentley
Attorney—Louis Etlinger

[57] ABSTRACT

A low data rate display is provided using light sources to represent range, and mechanical scanning of azimuth. In one embodiment a rotating arm synchronized to a rotating antenna has a number of light sources mounted along the length thereof each of which corresponds to a particular range and each of which is coupled to a particular range gate.

8 Claims, 4 Drawing Figures

INVENTOR
DANIEL BLITZ
BY Richard J. Seligman
ATTORNEY 3,713,143

LOW DATA RATE DISPLAYS

BACKGROUND OF THE INVENTION

In certain radar applications, the amount of information and its frequency content is low enough such that a cathode ray tube display is not required to display same. A cathode ray tube display necessitates a relatively expensive device, a relatively fragile device and a device which requires relatively high voltages and high power consumption.

SUMMARY OF THE INVENTION

Accordingly, it is an object of this invention to provide a new and novel display device.

It is another object of this invention to provide a display device not requiring electron beam deflection.

It is a further object of this invention to provide a display device which is light weight, compact and rugged.

It is a yet another object of this invention to provide a low power display device suitable for large displays.

Briefly, in one embodiment, a low data rate display is provided having a phosphorescent panel thereon which is excited by individual light sources in the visible or ultraviolet spectrum which light sources are mounted along the length of a rotating arm which rotates in synchronism with a radar antenna such that the position of the arm represents the azimuth of the antenna and the illumination of a particular light source along the length of the arm represents range.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENTS

Figure 1:
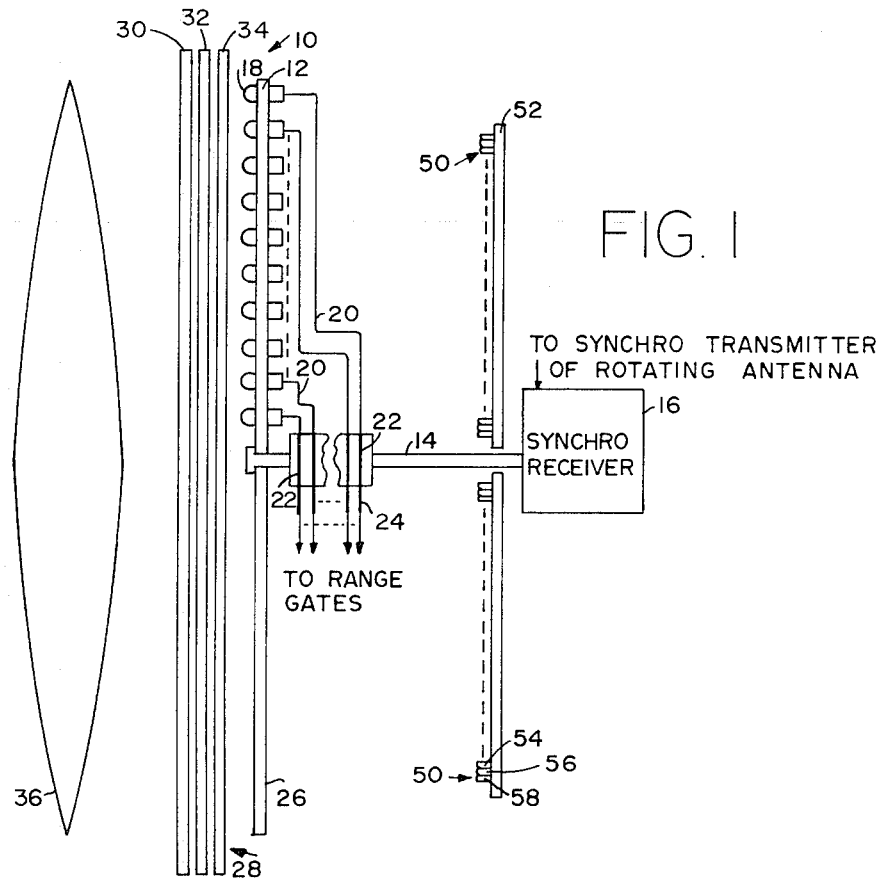
FIG. 1 is a sketch of a preferred embodiment of a low data rate display.
Figure 2:
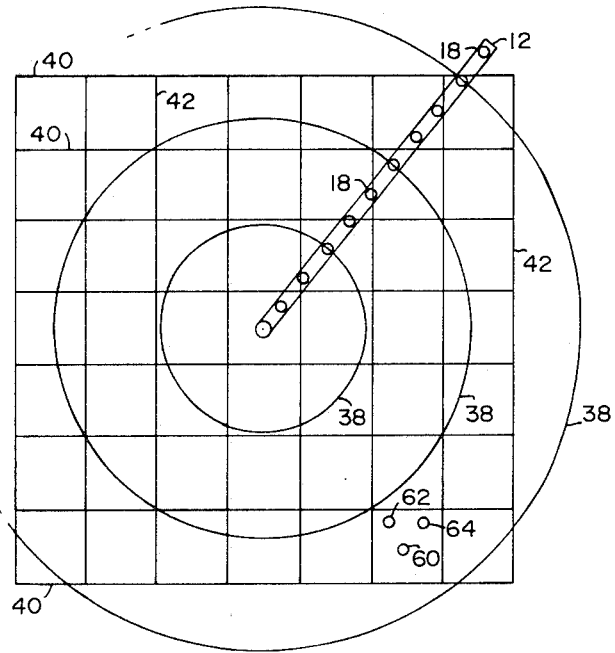
FIG. 2 is a sketch of the face plate of the display of FIG. 1.

Referring now to FIGS. 1 and 2, there is illustrated one embodiment of a display device 10. An arm 12 rotates in synchronism with, for example, a rotating antenna of a radar system. Arm 12 is attached to a shaft 14 of a synchro receiver 16 which receives an input from a synchro transmitter operating in conjunction with a rotating antenna (not shown). A number of light sources 18 are arranged along the length of shaft 12. In the FIGS. twenty light sources are illustrated. However, this is exemplary only and more or less light sources can be provided depending upon the degree of range resolution desired.

A number of connections 20 couple the light sources to a number of slip rings 22 on shaft 14. Each of the slip rings 22 is contacted by a corresponding brush 24 for coupling the outputs from the range gates of the radar to their appropriate light source 18. Upon detection of a target at a particular range, the output from the range gate will cause its respective light source 18 to be illuminated thereby indicating the range of the target, as will be shown in the description of FIG. 2.

A second arm 26 is, preferably, also attached to shaft 14 for providing a counter balance for arm 12.

Positioned adjacent the light sources 18 is a panel arrangement 28 comprising first and second edge lit panels 30 and 32, respectively, and a screen 34.

In this embodiment, the sychro receiver 16, using the synchro information from a rotating antenna, causes the arm 12 of the display to synchronously rotate about the center of the display so that its position behind the fact of the panel arrangement 28 always corresponds to the azimuth heading of the antenna. The presence of a signal in one of the range gates of the radar causes its respective light source 18 to light at a distance from the center of the display corresponding to the range to the target and at an azimuth position corresponding to the bearing to the target, thus providing a PPI display.

If a long persistence indication is desired, as in a conventional cathode ray tube display, panel 34 is coated with a slow decaying phosphorescent material. In the preferred embodiments, the coating is both fluorescent and phosphorescent and the light sources 18 are ultraviolet light sources.

This system can easily be made very large, for example, ten feet in diameter, thereby providing a display suitable for use in war rooms or FAA Traffic Control Centers. As an alternative, the mechanism itself can be made very small using small bright light sources which can be optically projected onto a large screen. A lens 36 is shown for this purpose. Lens 36 is shown in close proximity to the panel arrangement only for simplicity of illustration. In actuality the distance of lens 36 to the panel arrangement 28 is, preferably, at least as large as the diameter of the lens. Either a single lens can be used for the entire display or each light source can have its own projection lens.

When the information rate is slow enough, single intense light source can be mechanically modulated by electrically driven shutters, one shutter for each range. With very slow information, the range information can be presented serially to a single light source which is mechanically scanned radially as well as in azimuth instead of being presented in parallel to many light sources.

In the illustration of FIG. 1, the slip rings 22 connect the light bulbs to their range gates via the brushes 24. However, alternatively, the light sources can be stationary and their light output piped to the appropriate positions by fiber optic bundles connected to the rotating arm in the same manner in which the electrical connections 20 are shown.

A typical PPI display as described in FIG. 1 is set forth in FIG. 2. The light sources 18 are shown mounted on arm 12. Although as illustrated, it appears that the arm and/or the light sources would be seen at all times, this is not the case and only a light source which is illuminated would show through the screen. As shown in FIG. 1, two edge lit panels are provided. A first edge lit panel 32 has etched thereon a number of concentric circles 38 indicating range gradiations. Edge lit panel 30 comprises a grid network of horizontal lines 40 and vertical lines 42. This grid arrangement can be used to represent various sectors of a map. This second edge lit panel 32 can be movably arranged between the panels 30 and 34 to vary the center of the display to some other portion of the sector or at a portion of some particular sector other than the one shown in FIG. 2.

Figure 3:
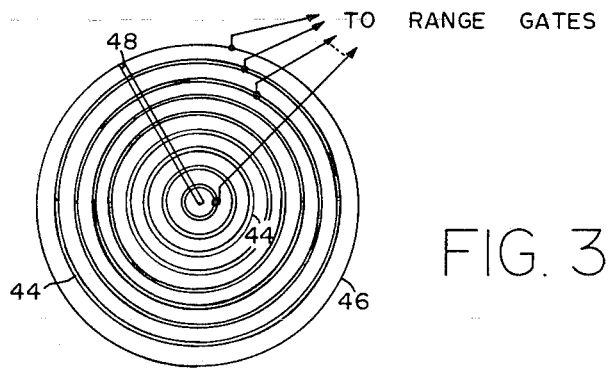
FIGS. 3 and 4 are sketches of a second embodiment of a low data rate display.
Figure 4:
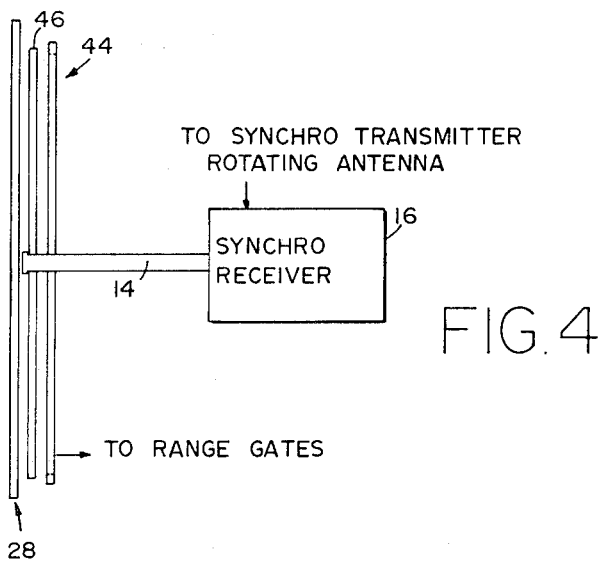

Another embodiment of the invention is shown in FIGS. 3 and 4 and comprises a number of concentric optical rings 44, one of which is coupled to each of the range gates of a radar. Preferably, the optical rings are fixed in position. An opaque rotating disc 46 having a slot 48 therein is coupled to shaft 14 of synchro receiver 16. The slot 48 is synchronously rotated around the center of the display so that its position between the optical rings 44 and the display panel arrangement 28 corresponds to the azimuth heading of the antenna. Therefore, the radial transparent slit in the opaque rotating disc only transmits light from the rings at the correct azimuth angle.

Alternatively, the opaque rotating disc 46 can be replaced by a rotating plastic rod acting as a lens or fiber optic filament packs can be used to carry the light from the rings to the display face, thus leaving the back of the face clear to have other light signals superimposed on the face.

An arrangement for providing these other lights is shown in FIG. 1, comprising groups of lights 50 mounted on a stationary panel 52. Each group of lights 50 can comprise for example individual lights 54, 56 and 58 of different colors. These lights would project onto and be displayed on the panel 34 as secondary information thereon to indicate, for example, friend or foe or other type information. Preferably, one set of lights 50 would be coupled for each of the map sectors. This is shown in FIG. 2 as three lights 60, 62 and 64 in one particular sector. The lights 54, 56 and 58, preferably, each have a small lens in front thereof for optimum projection capabilities.

While I have described above the principles of my invention in connection with specific apparatus, it is to be understood that the specification is presented by way of example and not as a limitation of the scope of my invention, as set forth in the accompanying claims.

I claim:

1. Apparatus for displaying low data rate range and azimuth information from an object location system having an antenna rotating in azimuth and a plurality of range gates, comprising:

a radial arm rotating in synchronism with a scanning antenna;

light bulbs arranged along the length of said arm, each of said light bulbs responsive to a different range gate; and a screen adjacent said light bulbs for displaying the illumination thereof.

2. Apparatus as defined in claim 1, wherein said screen is phosphorescent.

3. Apparatus as defined in claim 1, wherein said screen is phosphorescent and fluorescent and said light bulbs are ultraviolet light bulbs.

4. Apparatus as defined in claim 1, further including at least one edge lit panel adjacent said screen, said edge lit panel having markings thereon.

5. Apparatus as defined in claim 4, wherein said markings are concentric circles indicating range gradiations, said apparatus further including a second edge lit panel having a grid network of horizontal and vertical lines thereon.

6. Apparatus as defined in claim 1, further including means for projecting the information from said rotating light sources onto a screen for providing an enlarged display.

7. Apparatus as defined in claim 1, further including a stationary panel having a plurality of lights thereon, said stationary panel arranged parallel to said screen whereby illumination of any of said lights on said stationary panel would be displayed on said screen.

8. Apparatus for displaying low data rate range and azimuth information from an object location system having an antenna rotating in azimuth and a plurality of range gates, comprising:

an opaque disc having a slot therein rotating in synchronism with a scanning antenna;

a screen; nd a number of optical rings, said rings being illuminated in response to an output from range gates, said disc being arranged intermediate said optical rings and said screen, whereby said screen will be illuminated at a point corresponding to the position of said slot and the illumination of a particular ring.

* * * * *